United States Patent

Schoepe

[11] Patent Number: 5,378,362
[45] Date of Patent: Jan. 3, 1995

[54] APPARATUS FOR MAGNETICALLY TREATING WATER

[75] Inventor: Adolf Schoepe, Fullerton, Calif.
[73] Assignee: Fluidmaster, Inc., Anaheim, Calif.
[21] Appl. No.: 954,390
[22] Filed: Sep. 30, 1992
[51] Int. Cl.6 .............................................. C02F 1/48
[52] U.S. Cl. ..................................... 210/222; 210/695
[58] Field of Search ....................... 210/222, 695, 223; 123/538; 335/304

[56]  References Cited

U.S. PATENT DOCUMENTS

| | | | |
|---|---|---|---|
| 2,652,925 | 8/1949 | Vermeiren | 210/222 |
| 2,825,464 | 1/1954 | Mack | 210/222 |
| 3,170,871 | 11/1960 | Moriya et al. | 210/222 |
| 3,580,705 | 8/1972 | Happ | 210/222 |
| 3,669,274 | 6/1972 | Happ et al. | 210/222 |
| 3,923,550 | 12/1975 | Kottmeier | 210/222 |
| 3,951,807 | 4/1976 | Sanderson | 210/222 |
| 4,146,479 | 3/1979 | Brown | 210/222 |
| 4,157,963 | 6/1979 | Jessop et al. | 210/222 |
| 4,188,296 | 2/1980 | Fujita | 210/222 |
| 4,210,535 | 7/1980 | Risk | 210/222 |
| 4,216,092 | 8/1980 | Shalhoob et al. | 210/222 |
| 4,265,754 | 5/1981 | Menold | 210/222 |
| 4,265,755 | 5/1981 | Zimmerman | 210/222 |
| 4,414,951 | 11/1983 | Saneto | 210/222 |
| 4,428,837 | 1/1984 | Kronenberg | 210/222 |
| 4,879,045 | 11/1989 | Eggerichs | 210/223 |
| 4,946,590 | 8/1990 | Hertzog | 210/222 |

FOREIGN PATENT DOCUMENTS

| | | | |
|---|---|---|---|
| 264377 | 12/1963 | Australia . | |
| 189991 | 10/1984 | Japan | 210/222 |
| 1218963 | 6/1966 | Norway . | |
| WO85/03649 | 8/1985 | WIPO | 210/222 |

Primary Examiner—Matthew O. Savage
Attorney, Agent, or Firm—Arthur Freilich; Robert D. Hornbaker; Leon D. Rosen

[57]  ABSTRACT

A system is provided for treating water to reduce calcium carbonate deposits. At least three or four pairs of magnets (30a-30d and 32a-32d in FIG. 2) form a group of magnets that are mounted around a water-carrying pipe (12), with the magnets spaced apart parallel to the length of the pipe, and with the magnets of each pair lying on opposite sides of the pipe. Each pair of magnets (e.g. 30a, 32a) and a frame (34) that holds them, forms a unit which clamps individually around the pipe, to facilitate changing of the spacing between adjacent magnets. Two different groups of magnets (16, 18) can be employed, with the spacing of magnets in a first group being nonharmonic to the spacing in a second group.

1 Claim, 3 Drawing Sheets

APPARATUS FOR MAGNETICALLY TREATING WATER

BACKGROUND OF THE INVENTION:

It has been long known that the scale (primarily calcium carbonate) deposited in water-carrying pipes can be avoided or even removed by applying magnetic fields to the flowing water. U.S. Pat. No. 4,428,837 by Kronenberg describes various prior art approaches. Most approaches have required the installation of a special pipe section in a residential, commercial, or industrial water line, as to provide a helical path for the water or to provide magnets to lie within the water stream. Because of the considerable cost in cutting away a section of water pipe to install a treatment apparatus, potential customers have been reluctant to try such water treatment apparatus.

There have been proposals for water treatment apparatus, which involve magnets lying around an existing water pipe. U.S. Pat. Nos. 4,210,535 by Risk, 4,265,754 by Menold, and 4,265,755 by Zimmerman describe water treatment devices that can be installed on existing pipe lines without cutting away any pipe section. The Risk patent uses two magnets spaced along the length of the pipe, with both lying on the same side of the pipe. The Menold and Zimmerman patents use three magnets uniformly spaced along the length of the pipe, with soft iron joining the poles of adjacent magnets. In practice, such arrangements are only partially effective, and only under certain circumstances. Previously, the primary measurement of effectiveness was the degree of scale accumulation or removal, which could take several days before any effect was noticeable. It was difficult to determine whether and to what extent the devices were successful in reducing scale accumulation or removal, or under what circumstances and to what extent they were effective. Actually, their effectiveness was limited.

Apparatus which could be easily installed on existing water lines and which was highly effective in treating water to reduce scale as well as to enhance the usefulness of water for washing and in other applications, would be of considerable value.

SUMMARY OF THE INVENTION

In accordance with one embodiment of the present invention, an easily installed system is provided which is highly effective in treating water. The system includes at least three, and preferably at least four pairs of magnets spaced along the length of a water carrying pipe. Each pair includes first and second magnets lying on substantially opposite sides of the pipe, and pairs of adjacent magnets are spaced apart along the length of the pipe by primarily nonmagnetic material.

A number of magnet pairs are arranged in at least two different groups that are spaced from each other along the length of the pipe. The pairs of magnets of the first group are spaced apart differently from the pairs of magnets of the second group. The difference is such that the two different spacings are not harmonic, in that any whole number multiple of the closest spacing group differs by more than 5% from the spacing of the second group.

Each pair of magnets is preferably held in a separate frame to form a unit that is individually mountable around the pipe. Individually mountable spacers are also provided. The individual mounting of each pair of magnets enables adjustment of the spacing of pairs of magnets along the pipe.

The novel features of the invention are set forth with particularity in the appended claims. The invention will be best understood from the following description when read in conjunction with the accompanying drawings.

BRIEF DESCRIPTION OF THE DRAWINGS

FIG. 5 is a sectional view taken on line 5—5 of FIG. 4 which is taken along the axis of the pipe.

DESCRIPTION OF THE PREFERRED EMBODIMENTS

Figure 1:
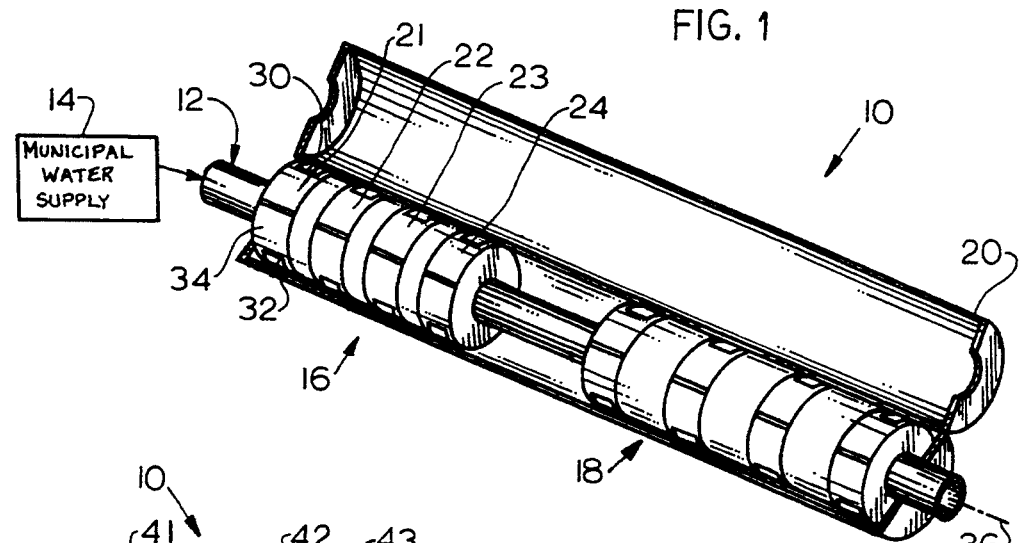
FIG. 1 is an isometric view of a water treatment system constructed in accordance with the present invention.

FIG. 1 illustrates a water treatment system 10 for treating water passing through an elongated pipe 12 such as one which receives pressured water from a municipal water supply 14. The pipe 12 is preferably nonmagnetic, as where it is constructed of copper or plastic. The system includes two independent subsystems 16, 18 that each include a group of magnets, with the magnets of the two subsystems differently spaced apart, as will be described below. A shroud 20 can be closed around the installed parts to protect them.

Figure 2:
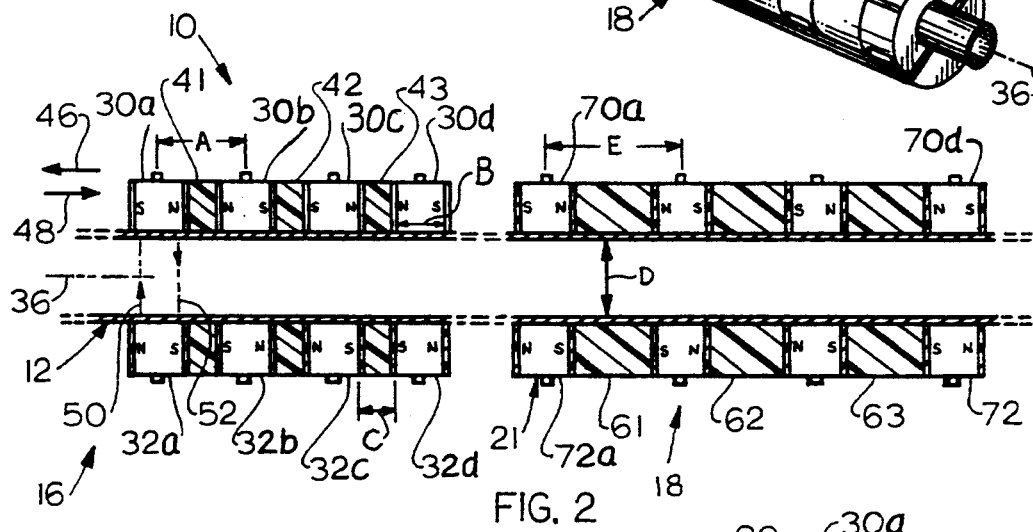
FIG. 2 is a simplified sectional view of the system of FIG. 1.

Subsystem 16 includes at least three, and preferably at least four units 21–24 mounted around the pipe 12. Each unit such as 21 includes a pair of permanent magnets 30, 32 lying at opposite sides of the pipe and mounted on a frame 34, with the frame 34 securely held around the pipe 12. As shown in FIG. 2, the four units 21–24 include four permanent magnets 30a–30d on one side of the pipe axis 36, and another group of four permanent magnets 32a–32d on the opposite side of the pipe axis. Spacers 41–43 keep adjacent pairs of magnets such as 30a, 32a and 30b, 32b at a predetermined center-to-center spacing A. The polarity of each magnet is such that its opposite polarities (S and N) are axially spaced (along the axis 36 of the pipe). The pole faces of each magnet are generally planar and extend in a direction generally perpendicular to the axis of the pipe. All magnets 30a–30d on one side of the pipe are arranged so adjacent faces of adjacent magnets (e.g. 30a and 30b) have the same magnetic polarity (e.g. magnets 30a, 30b have North magnetic poles on their adjacent faces). The magnets 32a–32d on the other side of the pipe are similarly arranged, but with the South pole face of one magnet 30a of a pair lying directly opposite and generally coplanar with the North pole face of the magnet 32a of the same pair. It can be seen in FIG. 2 that an imaginary first line 50 connects North and South poles of magnets 30a, 32a, respectively while another imaginary line 52 connects the south and north poles of the magnets 30a, 32a, respectively. The poles are shown lying directly across from each other and the lines 50, 52 do not cross as shown in FIG. 2.

The arrangement shown results in the magnetic lines of force passing through water in the pipe, extended largely perpendicular to the axis 36 of the pipe, as indicated by arrows 50 and 52. There are some largely axially-extending field lines, but their intensity is minimized by using magnets such as 30d of considerable width B and by using nonmagnetic spacers 41–43 to establish a considerable spacing between the poles of adjacent magnets on the same side of the pipe.

For present purposes, the "quality" of the water is defined as the resistance to deposition of scale on the inside of the pipe, and/or the removal of scale already coating the pipe. The scale is usually composed primarily of calcium carbonate, although it can include other minerals. Applicant finds that an improvement in quality for purposes of minimizing scale buildup, also results in improvement in water quality for washing purposes, in that the magnetically treated water avoids creation of spots on glasses which have been washed and air dried. Applicant's tests show that the treated water has a reduced surface tension, and for a given amount of soap creates more foam than untreated water. Applicant's microscopic examination of water shows that treated water results in the presence of large amounts of seeded crystals, each having a diameter between about one and ten microns, and a corresponding reduction in deposited (unclumped into seeded crystals) impurities.

Referring again to FIG. 2, it can be seen that the magnets 30a–30d and 32a–32d are uniformly spaced by a distance A. The particular pipe is a "three-quarter inch" pipe, which indicates that it has the same cross sectional area as a theoretical pipe whose inside is a square of side length of three-quarters inch, the inside diameter D being 0.85 inch. Each of the magnets is cube shaped, with each side having a length B of 0.5 inch. The spacer widths are chosen so the space C between magnets is three-eighths inch, and the center-to-center spacing A of the magnets is seven-eighths inch.

It was found that the subsystem 16 alone, when mounted on a home water pipe, was only sometimes highly effective. Applicant found that the effectiveness depended to a large extent upon the rate of flow of water through the pipe. However, applicant found that when the second subsystem 18 was installed, that the effectiveness was high for all flow rates above a certain minimum. The subsystem 18 is similar to that of the subsystem 16, except that wider spacers 61–63 are used. The magnets 70a–70d and 72a–72d are the same as those used in the first subsystem 16. The spacers are chosen so the center-to-center spacing E is 1.5 inches. The spacing E was chosen so that the spacings A and E are nonharmonic to each other. That is, so the smaller spacing A times a whole number is considerably different (at least 5% different) than the larger spacing E. It was found that such spacing difference resulted in highly effective water treatment for all rates of water flow through the pipe 12, above a certain minimum. Applicant believes that the effectiveness of a subunit in treating water to avoid the deposit of scale, depends upon the magnetic fields such as indicated at 50 and 52, being spaced to provide a resonance with respect to the oscillation of particles in the water, and that by using at least two different subsystems having nonharmonically spaced magnetic fields, that at least one of the subsystems will work effectively for any water flow above a certain minimum. Regardless of what actually happens, the use of at least two different subsystems with nonharmonically spaced magnetic poles, has been found to create effective water treatment over a wide range of flow rates. Where water flows at a constant speed at all times, as in certain industrial processes, a single subsystem may be sufficient. The best spacing distance of the units can be determined by trial and error.

Figure 3:
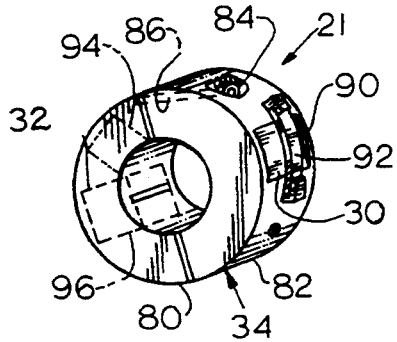
FIG. 3 is an isometric view of a unit, including two magnets and a frame, of the system of FIG. 1.

FIG. 3 shows one of the units 21. The frame 34 of the unit includes two frame parts 80, 82, each constructed to extend approximately 180° around a pipe of circular cross section. Each part such as 82 is formed of nonmagnetic material such as brass or plastic, and carries a screw 84 that screws into a threaded hole 86 of the other frame part. Each frame part has a square recess 90 which holds a magnet such as 30a. A retainer 92 fits over the top of the recess to hold the magnet in place. It is apparent that each unit 21 is individually mountable around the pipe, by merely placing the two frame parts 80, 82 (with the magnets therein) on opposite sides of the pipe and screwing in the screws 84. Although applicant has used only two magnets 30a, 32a in each unit, it is possible to use one or more than two. FIG. 3 indicates three magnets including magnet 30a and magnets 94, 96 shown in phantom lines and lying on substantially opposite sides of the unit axis 98.

FIG. 5, which is a view taken along the axis 36 of the pipe 12, shows that the sides 99 of the magnets 30a, 30b that lie closest to the pipe, have a magnet width which is no greater than the diameter of the pipe.

Figures 4, 6:
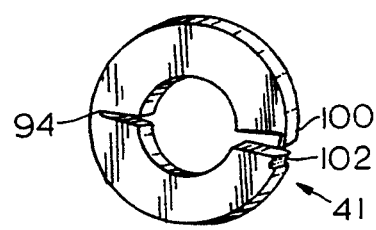
FIG. 4 is a top view of the unit of FIG. 3.
FIG. 6 is an isometric view of a spacer of the system of FIG. 1.

FIG. 6 illustrates one of the spacers 41 which molded of vinyl plastic and includes a "living hinge" 94 that enables it to be mounted around a pipe. A fastener arrangement, such as a hook 100 and strike 102 holds the spacer in place around the pipe. Spacers of different thicknesses are provided, so one can be used in a first subsystem and other spacers can be used in another subsystem.

Figure 7:
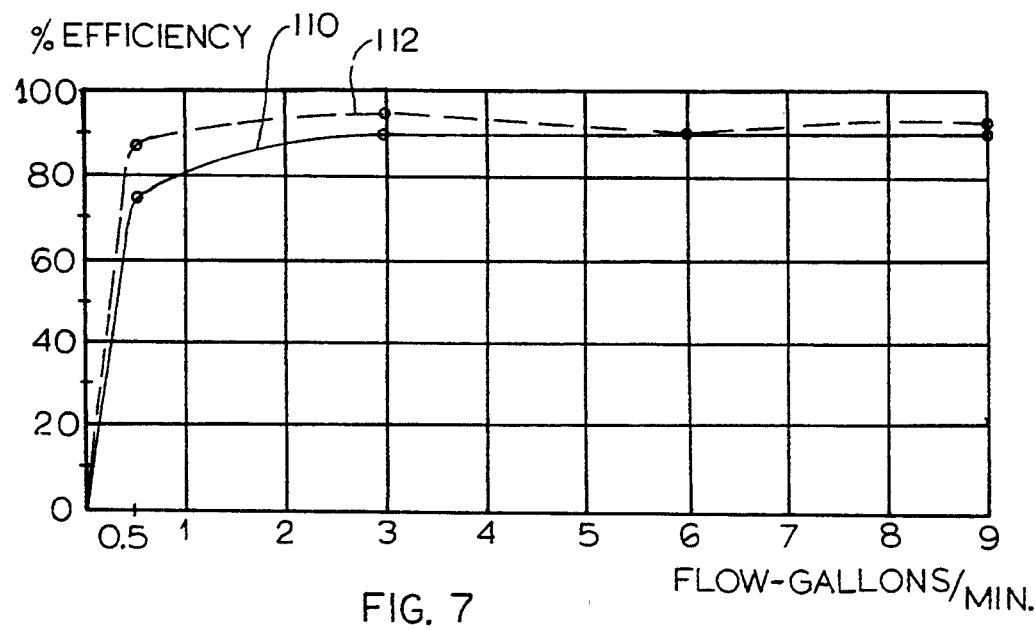
FIG. 7 is a graph showing the variation in treatment efficiency with water flow rate, in experiments conducted by applicant.

FIG. 7 includes a graph 110 which shows efficiency of water treatment using the system 10 of FIG. 2 which includes a first subsystem 16 that has four pairs of magnets at a first uniform spacing A, and a second subsystem 18 which includes four other pairs of magnets at a nonharmonic spacing E. The system is mounted around a nominal three-quarter inch copper pipe. The graph shows that the efficiency of water treatment reached over 70% at a flow rate of about 0.5 gallons per minute and increased gradually thereafter until maximum efficiency was achieved at a flow rate of about three gallons per minute through the pipe. At still higher flow rates, the efficiency remained about the same. FIG. 7 also includes a graph 112 which shows the variation in efficiency with flow rate through the same pipe, but wherein each subsystem such as 16, 18 of FIG. 2, included six pairs of magnets uniformly spaced along the length of the pipe. It can be seen that the greater number of magnets produces a moderate increase in efficiency at low flow rates such as about 0.5 to three gallons per minute, with the efficiency being about the same for flow rates of more than about five gallons per minute.

A comparison of the graphs 110,112 of FIG. 7 shows that where there is usually a flow rate of close to five gallons per minute or more, the use of only about four magnets in each subsystem can be sufficient. The test results indicate that effective water treatment requires that the water flow at a sufficient speed so the average water molecule passes through at least four spaced pairs of magnets in about one second or less. If the water flowing to the location of use is very low, the flow rate through the magnetic treatment system can be increased by recirculating some of the water through the magnetic treatment system. Applicant's system provides an efficiency of about 90% at moderate to higher flow rates, which is considerably greater than an efficiency of about 60% achievable with the best prior art clamp-on units.

Applicant has also used fewer magnets such as three pairs of magnets in series in each subsystem, and found that the efficiency was considerably lower than for four pairs of magnets. It may be noted that the efficiency was determined by measuring the rate of decrease in scale on the inside of the pipe, with pure (e.g. distilled) water having a scale deposition efficiency of 100% and completely untreated water having an efficiency of 0%. Microscopic examinations of water droplets determine that at 90% efficiency, only about 10% of the original mineral content remain unseeded, with the rest having formed into seeds (appearing as circles of about ten microns diameter in a microscope). Applicant found that the seeds remain in suspension for a period of about two days, after which the water tended to revert to its original quality, with the seeds degrading into mineral particles that would easily deposit on the inside of pipes.

Figure 8:
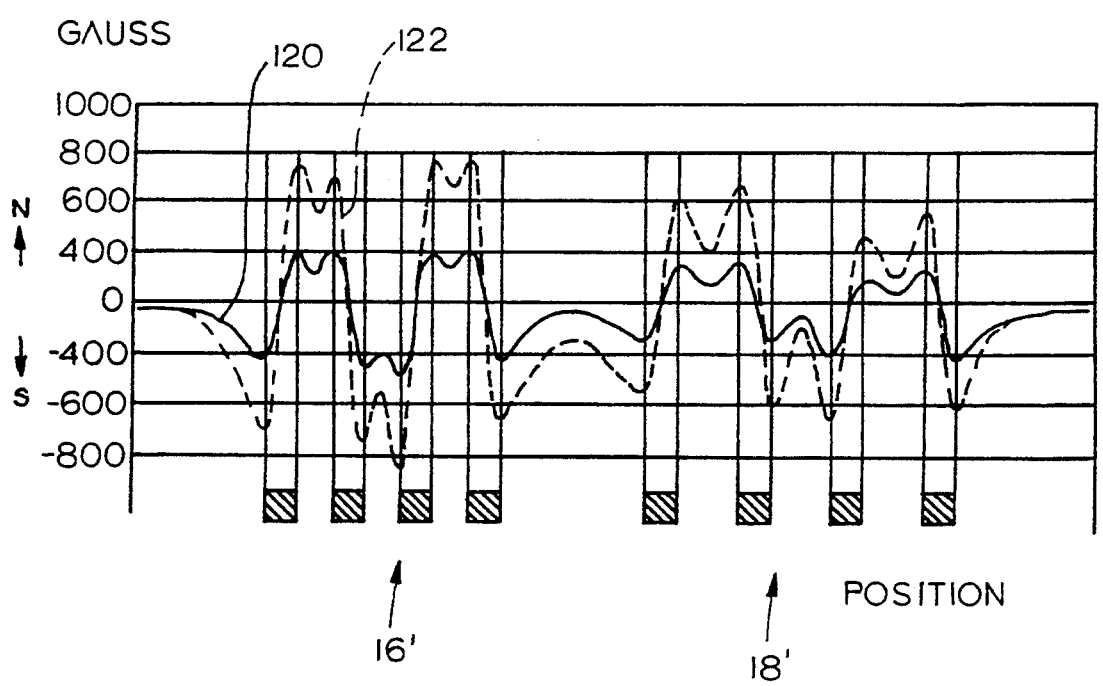
FIG. 8 is a graph showing the variation in magnetic field along portions of the pipe of FIG. 2, at the center of the pipe and at its inside wall.

FIG. 8 includes a graph 120 showing the variation in magnetic field along the axis of a pipe similar to that shown in FIG. 2, along a first subsystem 16' and along a second subsystem 18'. The system is the same as in FIG. 2 except that the magnets were spaced apart by slightly greater distances. FIG. 8 also includes a graph 122 which shows the variation in magnetic field along the inside wall of the pipe, at the top of the pipe adjacent to one set of magnets. It can be seen that the magnetic flux intensity is greatest along lines such as 50, 52 in FIG. 2, directly between opposite poles of the magnets of a pair.

Figure 9:
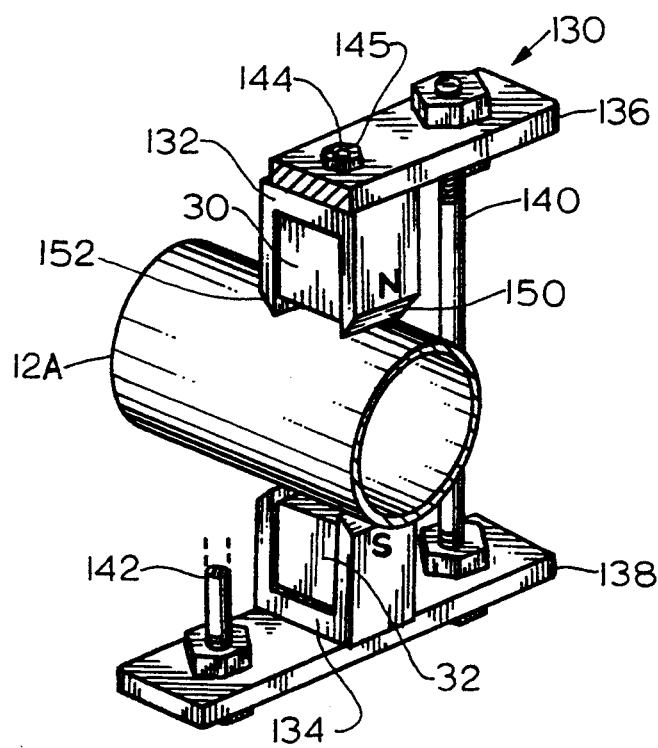
FIG. 9 is an isometric view of a unit constructed in accordance with another embodiment of the invention, shown mounted on a pipe.
Figure 10:
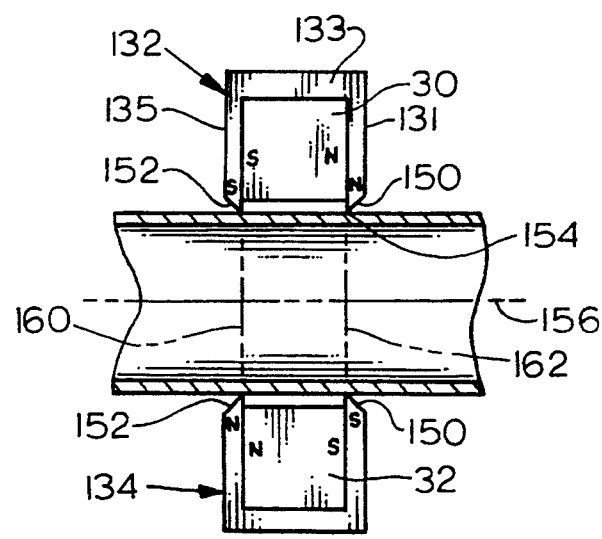
FIG. 10 is a partial side view of the unit of FIG. 9.
Figure 11:
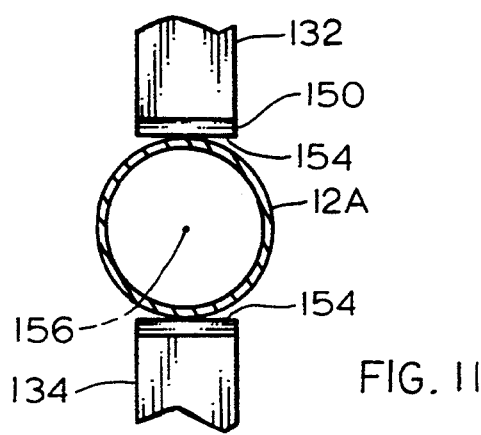
FIG. 11 is a partial end view of the unit of FIG. 9.

FIGS. 9-11 illustrate another magnetic field unit 130 that applicant has constructed and tested. The unit 130 includes two magnets 30, 32 that are each held in a keeper 132, 134 of magnetic material such as of (preferably nickel plated) cold rolled steel. Each keeper, or device, has first and second portions 131, 133 lying against different pole faces, and has a third portion 135 that connects the other portions, with all three portions being constructed of magnetic material. The magnets are fixed in place by a clamping device that includes a pair of plates 136, 138 joined by a pair of screws 140, 142. Each keeper such as 132 is held to a plate by a rod 144 and nut 145.

Each keeper such as 132 has a pair of beveled ends 150, 152 that lie against a copper pipe, 12A. The beveled ends may tend to concentrate the magnetic field so it tends to emerge along a narrow path, from the tip 154 of the beveled end. The concentration can provide a greater density of magnetic flux extending perpendicular to the copper pipe axis 156 and less magnetic flux extending parallel to it, for more effective water treatment. However, substantially flat keeper ends can be used. It can be seen in FIG. 10 than an imaginary first line 160 connects North and South poles of magnets 30, 32, respectively, while another imaginary line 162 connects the south and north poles of the magnets 30,32, respectively. The poles lie directly across from each other in that lines 160, 162 do not cross as shown in FIG. 10.

Thus, the invention provides a system for magnetically treating water passing through an elongated pipe, which efficiently enhances properties of the water, particularly in reducing scale deposits and additionally in reducing surface tension and obtaining the advantages therefrom. The apparatus includes at least three pairs of magnets spaced along the length of the pipe and lying closely outside the pipe, with each pair lying on substantially opposite sides of the pipe. Each pair of magnets is mounted on a frame to form a unit, with each unit being individually mountable around the pipe. Spacers are preferably provided to space the pairs of magnets from each other, and allow different spacings by using different spacers. The individually mounted magnet units and spacers enable easy mounting and adjustment of spacing. High efficiency is obtainable for a variety of flow rates, by using at least two subsystems, each including at least three pairs of magnets, with the center-to-center spacing of magnets in a first system being nonharmonic to the spacing of magnets in a second system.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus for magnetically treating water passing through an elongated pipe to enhance properties of the water comprising:

a pipe that has an axis;

a group of magnets lying substantially against said pipe to apply a magnetic field to water flowing through the pipe, said group including at least three pairs of magnets uniformly spaced apart along the length of the pipe;

the magnets of each pair lying on opposite sides of said pipe with each magnet having North and South pole faces that each face in opposite directions each said pole face being generally planar and extending in a direction generally perpendicular to said axis, and with the magnetic polarity of each said pair arranged so that the North and South pole faces of a first magnet of a pair are generally coplanar with the South and North pole faces, respectively, of the second magnet of the pair, so an imaginary first line connecting said North pole face of said first magnet to said South pole face of said second magnet, does not cross an imaginary second line connecting said South pole face of said first magnet to said North pole face of said second magnet, all as seen in a view taken perpendicular to said axis.

* * * * *